United States Patent
Fuji et al.

(10) Patent No.: US 10,077,000 B2
(45) Date of Patent: Sep. 18, 2018

(54) DOOR MIRROR

(71) Applicant: FUJI JUKOGYO KABUSHIKI KAISHA, Tokyo (JP)

(72) Inventors: Kei Fuji, Tokyo (JP); Hisashi Nagano, Tokyo (JP); Masahiko Ikeo, Tokyo (JP); Motonari Masatani, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/067,599

(22) Filed: Mar. 11, 2016

(65) Prior Publication Data

US 2016/0288714 A1    Oct. 6, 2016

(30) Foreign Application Priority Data

Mar. 31, 2015 (JP) ................. 2015-072550

(51) Int. Cl.
| | | |
|---|---|---|
| *B60R 1/072* | (2006.01) | |
| *B60R 1/078* | (2006.01) | |
| *B60R 1/074* | (2006.01) | |
| *B60R 1/12* | (2006.01) | |

(52) U.S. Cl.
CPC .............. *B60R 1/072* (2013.01); *B60R 1/074* (2013.01); *B60R 1/078* (2013.01); *B60R 2001/1223* (2013.01)

(58) Field of Classification Search
CPC . B60R 1/072; B60R 1/074; B60R 2001/1223; B60R 1/0078
USPC ................................. 359/841, 877
See application file for complete search history.

(56) References Cited

U.S. PATENT DOCUMENTS

| | | | | |
|---|---|---|---|---|
| 4,267,494 A | * | 5/1981 | Matsuoka | G05B 19/351 180/326 |
| 4,727,302 A | * | 2/1988 | Mizuta | B60R 1/025 318/466 |
| 5,268,795 A | * | 12/1993 | Usami | B60R 1/06 248/475.1 |
| 6,116,743 A | * | 9/2000 | Hoek | B60R 1/078 359/871 |
| 6,204,753 B1 | * | 3/2001 | Schenk | B60R 1/062 340/435 |

(Continued)

FOREIGN PATENT DOCUMENTS

| | | | |
|---|---|---|---|
| JP | 61-146653 | * | 7/1986 |
| JP | 07-277077 A | | 10/1995 |

(Continued)

OTHER PUBLICATIONS

Office Action received for Japanese Patent application No. 2015-072550, dated Sep. 13, 2016, 15 pages of office action including 10 pages of English translation.
Office Action received for Japanese Patent application No. 2015-072550, dated Apr. 4, 2017, 4 pages of office action and 5 pages of English translation.

*Primary Examiner* — Ricky D Shafer
(74) *Attorney, Agent, or Firm* — Chip Law Group (57) ABSTRACT

A door mirror is disposed at a side of a vehicle body, and the door mirror includes a mirror body that is provided at a tip of a door mirror stay extending from the side of the vehicle body in at least one of a width direction and a vertical direction of the vehicle body, and an actuator that changes an interval between the vehicle body and the mirror body. The mirror body is actuated in accordance with at least any of a traveling environment and a passenger state.

6 Claims, 6 Drawing Sheets

(56) References Cited

U.S. PATENT DOCUMENTS

| | | | |
|---|---|---|---|
| 7,325,936 B2* | 2/2008 | Sakamoto | B60R 1/025 307/10.1 |
| 7,571,041 B2* | 8/2009 | Lee | B60R 1/025 307/10.1 |
| 9,481,304 B2* | 11/2016 | Dykhouse | B60R 1/0602 |
| 2006/0056086 A1* | 3/2006 | Hannah | B60Q 1/2665 359/843 |
| 2010/0039722 A1* | 2/2010 | Lee | B60R 1/00 359/843 |
| 2010/0220406 A1* | 9/2010 | Cuddihy | B60R 1/025 359/843 |
| 2012/0162788 A1* | 6/2012 | Luan | G02B 7/023 359/811 |
| 2012/0162797 A1* | 6/2012 | Luo | B60R 1/025 359/843 |

FOREIGN PATENT DOCUMENTS

| | | |
|---|---|---|
| JP | 2000177487 A | 6/2000 |
| JP | 2007-050761 A | 3/2007 |
| JP | 2008-081071 A | 4/2008 |
| JP | 2009280196 A | 12/2009 |

* cited by examiner

DOOR MIRROR

CROSS-REFERENCE TO RELATED APPLICATIONS

The present application claims priority from Japanese Patent Application No. 2015-072550 filed on Mar. 31, 2015, the entire contents of which are hereby incorporated by reference.

BACKGROUND

1. Technical Field

The present invention relates to door mirrors, and in particular, relates to a door mirror that prevents the temperature of the vehicle compartment from declining due to wind generated in the vicinity of a side window while the vehicle is traveling at high speed, or slows the decline of the temperature.

2. Related Art

For instance, a door mirror equipped with a movable fin at the door mirror base is known as a door mirror that allows a driver to see an area behind the vehicle, the movable fin being capable of pivoting outward with respect to the width direction of the vehicle (see Japanese Unexamined Patent Application Publication No. 2007-050761).

A large number of vehicles equipped with the door mirror and the like each fail to have traveling wind flow along a side of the vehicle body behind the door mirror. That is to say, the vehicle does not have preferable aerodynamic characteristics with respect to the vehicle body behind the door mirror.

Meanwhile, some vehicles each have a door mirror stay protrude from a door mirror base or a side of the vehicle body, and further include a mirror body at the tip of the door mirror stay. A large number of vehicles today rectify traveling wind with the door mirror stay and the mirror body. This lets traveling wind flow along the vehicle body behind the door mirror and serves to maintain preferable aerodynamic characteristics of the vehicle body behind the door mirror.

Traveling wind flowing along a side window while the vehicle is traveling, however, takes away heat from the vehicle compartment via the side window in some cases. This brings down the temperature of part of the vehicle compartment in the vicinity of the side window. More heat is likely to be taken away especially while the vehicle is traveling at high speed, causing a decrease in the heating efficiency of the vehicle compartment when the outside temperature is low.

SUMMARY OF THE INVENTION

An object to be solved by the present invention is thus to provide a door mirror that prevents the temperature of the vehicle compartment from declining due to wind generated in the vicinity of a side window while the vehicle is traveling, or slows the decline of the temperature.

To solve the above-described problem, a door mirror according to the present invention is disposed at a side of a vehicle body, and includes: a mirror body that is provided at a tip of a door mirror stay extending from the side of the vehicle body in at least one of a width direction and a vertical direction of the vehicle body; and an actuator that changes an interval between the vehicle body and the mirror body. The mirror body is actuated in accordance with at least any one of a traveling environment and a passenger state.

In the door mirror according to the present invention, the actuator may include a pivot shaft that is disposed along the vertical direction of the vehicle body or substantially along the vertical direction of the vehicle body, and a pivoting member that pivots an outward end of the mirror body with respect to the width direction of the vehicle body backward around the pivot shaft.

In the door mirror according to the present invention, the mirror body may include a mirror that is disposed in a manner that a mirror surface faces backward, and a cover that is put over at least a front portion of the mirror which faces in an advancing direction of a vehicle equipped with the door mirror, and the actuator may pivot the mirror and the cover backward, and pivots the mirror forward.

In the door mirror according to the present invention, the mirror body may include a mirror that is disposed in a manner that a mirror surface faces backward, and a cover that is put over at least a front portion of the mirror which faces in an advancing direction of a vehicle equipped with the door mirror, and the actuator may pivot the cover backward without changing a posture of the mirror relative to the vehicle body.

In the door mirror according to the present invention, the mirror body may have a change amount of the interval that is variable in accordance with a sitting state of a passenger.

DETAILED DESCRIPTION

Hereinafter, preferred implementations of the present disclosure will be described in detail with reference to the appended drawings. Note that, in this specification and the appended drawings, structural elements that have substantially the same function and structure are denoted with the same reference numerals, and repeated description of these structural elements is omitted.

A door mirror according to an implementation of the present invention will be described with reference to FIGS. 1A to 2B.

Figure 1A:
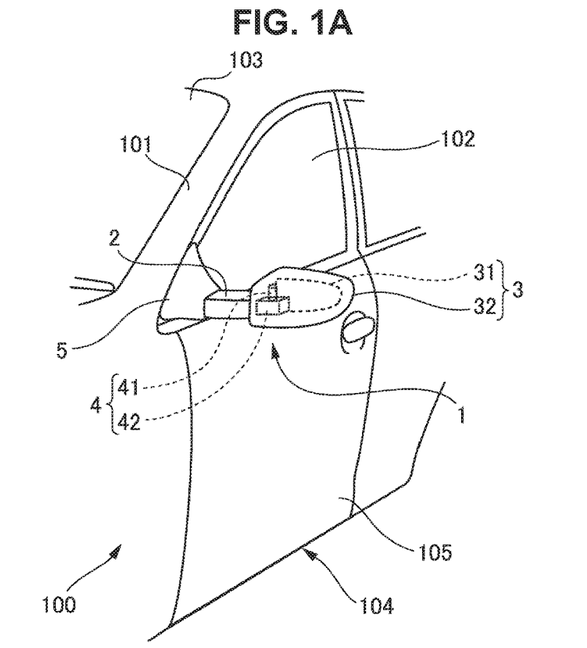
FIG. 1A is a perspective view schematically illustrating a door mirror according to an implementation of the present invention, and in particular, schematically illustrates the door mirror with a mirror body not pivoted.
Figure 1B:
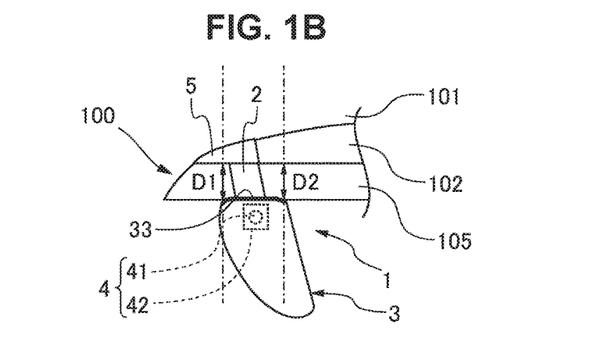
FIG. 1B is a perspective view schematically illustrating the door mirror according to the implementation of the present invention, and in particular, is a schematic plan view of the door mirror illustrated in FIG. 1A.
Figure 1C:
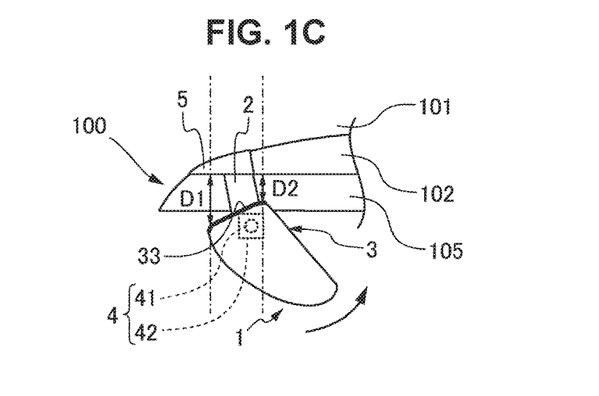
FIG. 1C is a perspective view schematically illustrating the door mirror according to the implementation of the present invention, and in particular, is a schematic plan view of the door mirror with the mirror body pivoted.
Figure 2A:
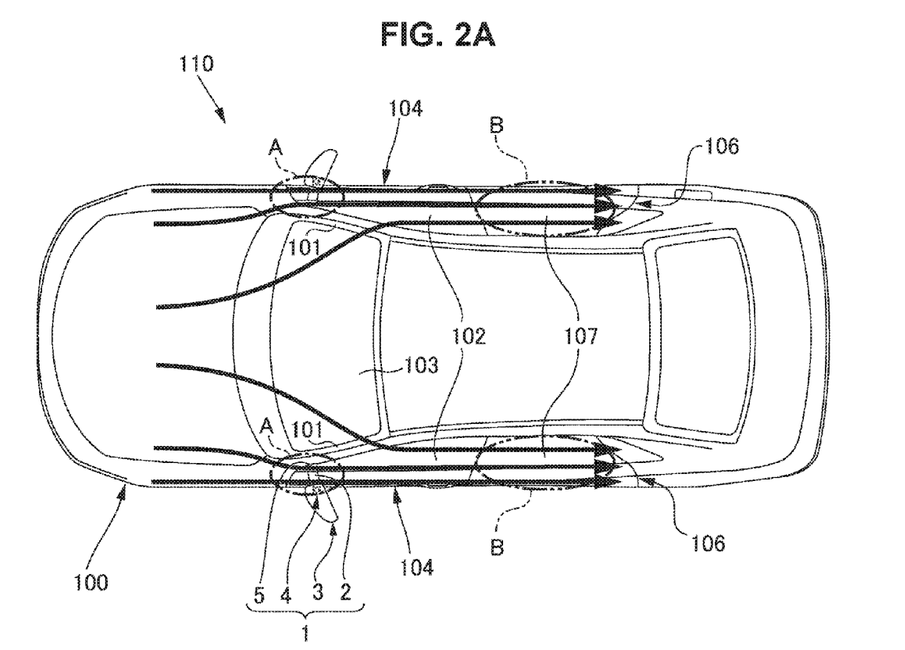
FIG. 2A is a schematic plan view of a vehicle to which the door mirror illustrated in FIGS. 1A to 1C is applied, and in particular, schematically illustrates the vehicle with the mirror body not pivoted.
Figure 2B:
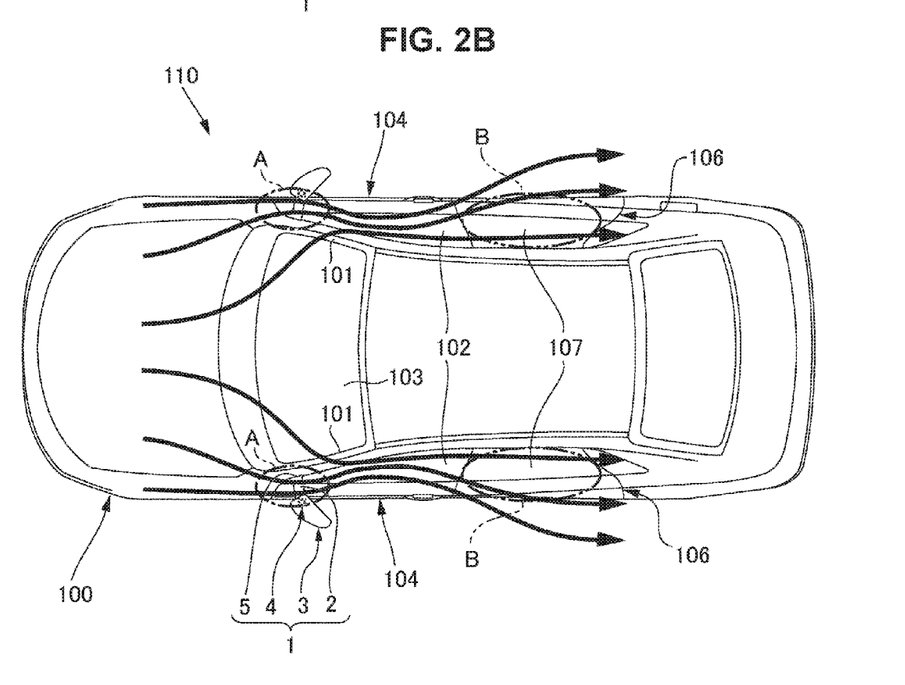
FIG. 2B is a schematic plan view of the vehicle to which the door mirror illustrated in FIGS. 1A to 1C is applied, and in particular, schematically illustrates the vehicle with the mirror body pivoted.

Each of FIGS. 1A to 1C is a perspective view schematically illustrating a door mirror 1 according to the implementation of the present invention, FIG. 1A is a perspective view schematically illustrating the door mirror 1 with a mirror body 3 not pivoted, FIG. 1B is a schematic plan view of the door mirror 1 illustrated in FIG. 1A, and FIG. 1C is a schematic plan view illustrating the door mirror 1 with the mirror body 3 pivoted. Meanwhile, each of FIGS. 2A and 2B is a schematic plan view of a vehicle 110 to which the door mirror 1 illustrated in FIGS. 1A to 1C is applied, FIG. 2A is a schematic plan view of the vehicle 110 with the mirror body 3 not pivoted, and FIG. 2B is a schematic plan view of the vehicle 110 with the mirror body 3 pivoted.

First, the door mirrors according to the present invention can be applied to a vehicle from the vehicle compartment of which traveling wind generated while the vehicle is traveling may take away heat via the side windows provided at the respective front doors and rear doors. In particular, it is preferable to apply the door mirrors according to the present invention to a vehicle capable of traveling at high speed.

(1) First Implementation

As illustrated in FIG. 1A, the door mirror 1 includes a door mirror stay 2, the mirror body 3, and an actuator 4. Additionally, the door mirror 1 is disposed on a side of a vehicle body 100, and used to allow a passenger of the vehicle 110 to see an area behind the vehicle 110.

As illustrated in FIG. 1A, the door mirror stay 2 is a member extending from a side of the vehicle body 100 substantially in the width direction of the vehicle body 100. The door mirror stay 2 has a substantially rectangular column shape, and is disposed to slightly incline the longitudinal direction backward with respect to the width direction of the vehicle body 100 illustrated especially in FIGS. 2A and 2B.

As illustrated in FIG. 1A, the door mirror stay 2 is attached to the vehicle body 100 via a door mirror base 5. The door mirror base 5 is provided at the lower end of an A pillar 101 and the front end of a front side window 102. The A pillar 101 is a columnar member provided between a front window 103 of a window member disposed to face in the advancing direction of the vehicle body 100, and the front side window 102. The front side window 102 is a window member disposed at the upper portion of a front door panel 105 included in the exterior parts in the front door 104 disposed on a front side of the vehicle body 100.

As illustrated in FIG. 1A, the mirror body 3 is a member disposed at the tip of the door mirror stay 2. The mirror body 3 includes a mirror 31 whose mirror surface faces backward, the mirror surface allowing a passenger to visually recognize an area behind the vehicle 110, and a cover 32 that is put over the front portion and upper portion of the mirror 31, the front portion facing in the advancing direction of the vehicle 110. The cover 32 has the actuator 4 built therein. The actuator 4 will be discussed below.

The actuator 4 is a member that changes the interval between the vehicle body 100 and the mirror body 3. More specifically, the actuator 4 includes a pivot shaft 41 and a pivoting member 42 as illustrated in FIGS. 1A to 1C. The pivot shaft 41 is disposed substantially along the vertical direction of the vehicle body 100. Meanwhile, the pivoting member 42 pivots the outward end of the mirror body 3 with respect to the width direction of the vehicle body 100 backward around the pivot shaft 41, and for instance, an electric motor and the like can be adopted as the pivoting member 42. The actuator 4 is driven by an electrical signal, and can pivot the mirror body 3. Additionally, the actuator 4 can also be used for pivoting the mirror body 3 to store the door mirror 1 when the vehicle 110 is parked in the present implementation.

Once the pivoting member 42 of the actuator 4 is driven, the mirror body 3 is pivoted backward around the pivot shaft 41 as illustrated from FIG. 1B to FIG. 1C. The cover 32 of the mirror body 3 according to the present implementation is formed substantially in parallel with the front door 104 of the vehicle body 100 on the inside with respect to the width direction of the vehicle body 100, and has a facing surface 33 (illustrated by the thick lines in FIGS. 1B and 1C) disposed to face the front side window 102.

The distances between the front side window 102 of the vehicle body 100 and a given portion of the cover 32 of the mirror body 3 are compared before and after the mirror body 3 is pivoted as the interval between the vehicle body 100 and the mirror body 3. First and second distances D1 and D2 between the front side window 102 and give two points of the cover 32 are compared before and after the mirror body 3 is pivoted in the implementation illustrated in FIGS. 1A to 1C.

When the actuator 4 is not driven, nor is the mirror body 3 pivoted as illustrated in FIG. 1B, the first distance D1 between the front end of the facing surface 33 and the front side window 102 is substantially the same as the second distance D2 between the back end of the facing surface 33 and the front side window 102. Furthermore, when the actuator 4 is driven and the mirror body 3 is pivoted as illustrated in FIG. 1C, the first distance D1 is longer than that of FIG. 1B and the second distance D2 is shorter than that of FIG. 1B. That is to say, the mirror body 3 is pivoted by the actuator 4, thereby changing the interval between the vehicle body 100 and each portion of the mirror body 3.

(2) Effects on Traveling Wind according to Driven Actuator

FIGS. 2A and 2B each schematically illustrate the flowing directions of traveling wind with thick arrows. The following describes the flowing areas of traveling wind formed between the vehicle body 100 and the mirror body 3 in the width direction of the vehicle body 100, that is to say, between the vehicle body 100 and the cover 32 of the mirror body 3 on the inside with respect to the width direction of the vehicle body 100 in particular, as front flowing areas A illustrated by the one-dot chain lines in FIGS. 2A and 2B. In addition, the flowing areas of traveling wind formed along the vehicle body 100 behind the front flowing areas A and in the vicinity of the rear seats will be described as back flowing areas B illustrated by the two-dot chain lines in FIGS. 2A and 2B. Although the front flowing areas A and the back flowing areas B are illustrated only in plan view like FIGS. 2A and 2B, they are formed from the upper end to the lower end of the vehicle body 100.

When the actuator 4 is not driven, that is to say, when the vehicle 110 is traveling with the mirror body 3 not pivoted as illustrated in FIG. 1A, the traveling wind flowing through the back flowing area B flows along a rear side window 107 of a rear door 106 as illustrated in FIG. 2A. Especially while the vehicle 110 is traveling at high speed, the traveling wind on the side of the vehicle body 100 flows close to the rear side window 107.

When it is relatively cooler on the outside of the vehicle 110 than in the vehicle compartment of the vehicle 110, the traveling wind flowing along the rear side window 107 takes away heat from the vehicle compartment of the vehicle 110 via the rear side window 107. This lets the vehicle 110 to radiate heat via the rear side window 107 by traveling, consequently bringing down the temperature of the vehicle compartment of the vehicle 110.

As the vehicle 110 travels at higher speed, more heat is taken away from the vehicle compartment of the vehicle 110 by traveling wind. Especially while the vehicle 110 is traveling at high speed, traveling wind flows close to the rear side window 107 as discussed above. Accordingly, considerably much heat is taken away from the vehicle compartment of the vehicle 110 by the traveling wind. When the outside temperature is low as a traveling environment of the vehicle 110, and the vehicle 110 travels at high speed, the temperature of part of the vehicle compartment in the vicinity of the rear side window 107 considerably declines as a result. In this case, the heating efficiency of the vehicle compartment of the vehicle 110 is decreased.

Additionally, traveling wind also flows along the front side window 102 of the front door 104, bringing down the temperature of part of the vehicle compartment in the vicinity of the front side window 102. While the vehicle 110 is traveling at high speed, more heat is likely to be taken away from the vehicle compartment of the vehicle 110 via the rear side window 107 than via the front side window 102.

Some vehicles equipped with a conventional door mirror do not rectify traveling wind with the door mirror stay 2 and the mirror body 3. In this case, traveling wind seldom takes away so much heat from the vehicle compartment of the vehicle via the side windows. Such conventional vehicles are frequently designed with no door mirror stay 2 or the like.

In contrast, the door mirror 1 according to the present implementation rectifies traveling wind with the door mirror stay 2 and the mirror body 3. This improves the aerodynamic characteristics of the vehicle body 100, so that it is possible, for instance, to improve the fuel efficiency. However, when the temperature outside is low and the vehicle 110 travels at high speed, it is possible that the door mirror stay 2 and the mirror body 3 rectify traveling wind too much, and then much heat is exchanged between the traveling wind and the vehicle compartment of the vehicle 110 via the side windows.

When the actuator 4 is driven, that is to say, when the vehicle 110 is traveling with the mirror body 3 pivoted forward as illustrated in FIG. 1C, the traveling wind flowing through the back flowing area B flows away from the rear side window 107 as illustrated in FIG. 2B.

As illustrated in FIG. 1C, the actuator 4 is driven to change the first distance D1 and the second distance D2 between the vehicle body 100 and the facing surface 33 of the mirror body 3 as compared with those before the actuator 4 is driven, so that the traveling wind flowing through the front flowing area A hits against the pivoted mirror body 3 as illustrated in FIG. 2B. It is difficult in the present implementation to rectify, by pivoting the mirror body 3, the traveling wind flowing through the front flowing area A, which may significantly influence the direction, amount, and the like of the traveling wind flowing through the back flowing area B. The traveling wind hitting against the mirror body 3 in the front flowing area A flows at lower speed, and further gets unstable and disturbed with respect to the flowing direction. This changes the pressure of the traveling wind flowing along the rear side window 107 in the back flowing area B at each position in the front-back direction and width direction of the vehicle body 100. Accordingly, part of the traveling wind flows away from the front side window 107. Thus less traveling wind flows in the vicinity of the rear side window 107 in the back flowing area B, so that less heat is taken away from the vehicle compartment of the vehicle 110 by the traveling wind via the rear side window 107. As a result, it is possible to prevent the temperature of the vehicle compartment from declining due to traveling wind or to slow the decline of the temperature.

(3) Drive Control over Actuator

Drive control over the actuator 4 will be here described with reference to FIGS. 3 and 4.

Figure 3:
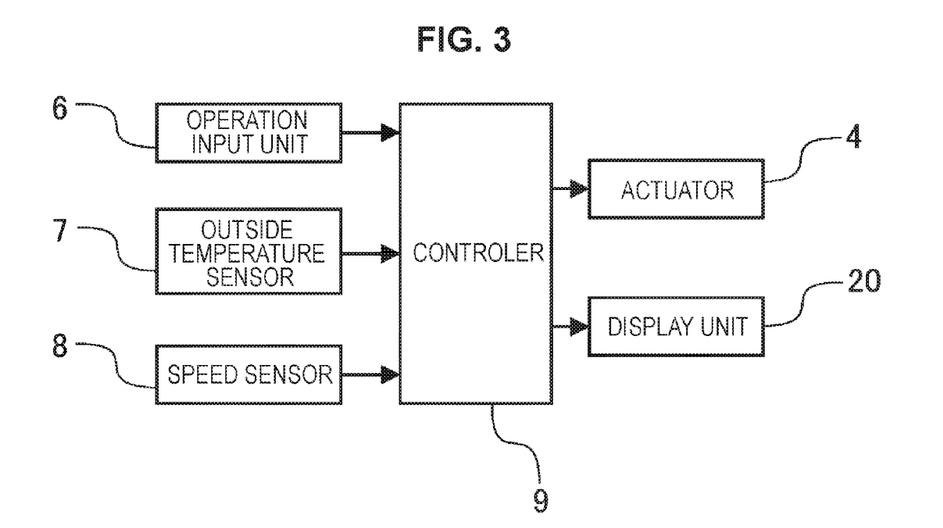
FIG. 3 is a block diagram illustrating a control system for an actuator.

FIG. 3 is a block diagram illustrating a control system for the actuator 4. FIG. 4 is a flowchart for driving the actuator 4.

Operating an operation input unit 6 such as a push button, an operation lever, or a touch panel in the environment that the traveling wind flowing along a side window takes away heat from the vehicle compartment of the vehicle 110 via the side window allows the actuator 4 to be driven to pivot the mirror body 3. Examples of the environment include one in which the outside temperature is low, and furthermore, the vehicle 110 travels at high speed.

As illustrated in FIG. 3, a controller 9 receives a signal based on an operation input to the operation input unit 6, a signal related to the temperature outside the vehicle 110 detected by an outside temperature sensor 7, and a signal related to the traveling speed of the vehicle 110 detected by a speed sensor 8 in the control system for the actuator 4 according to the present implementation. The controller 9 is capable of outputting a drive signal to the actuator 4, and outputting a signal that allows a display unit 20 including a display or the like disposed in the vehicle compartment to display the temperature outside the vehicle 110, the traveling speed of the vehicle 110, the state of the driven actuator 4, and the like. Once a signal based on an operation is input from the operation input unit 6, the controller 9 according to the present implementation can output a drive signal to the actuator 4. For instance, FIG. 4 illustrates drive control over the actuator 4.

First of all, it is determined whether or not the temperature outside the vehicle 110 is lower than a predetermined temperature as drive control over the actuator 4 (step S1). Then, the actuator 4 is not driven, nor is the mirror body 3 pivoted as illustrated in FIGS. 1A and 1B. The outside temperature sensor 7 consecutively inputs signals related to the temperature outside the vehicle 110 to the controller 9. The controller 9 can determine whether the temperature outside the vehicle 110 is lower or higher than the predetermined temperature set in advance, by comparing the predetermined temperature with the temperature outside the vehicle 110.

Additionally, the predetermined temperature is set at a temperature at which a passenger feels like using a heater, and is set as appropriate, for instance, in accordance with the clothes of the passenger, the temperature of the vehicle compartment which the passenger considers appropriate, the difference between the temperature of the vehicle compartment and the temperature outside the vehicle 110, and the like.

If the temperature outside the vehicle 110 is higher than the predetermined temperature (NO in step S1), the passenger does not or is unlikely to feel like using a heater of the vehicle compartment of in spite of the traveling wind flowing through the back flowing area B and taking away heat from the vehicle compartment via the rear side window 107. Accordingly, there is no need to drive the actuator 4.

If the temperature outside the vehicle 110 is lower than the predetermined temperature (YES in step S1), the traveling wind flowing the back flowing area B takes away much heat from the vehicle compartment of the vehicle 110 via the rear side window 107. This facilitates the temperature of the vehicle compartment to decline.

Next, it is determined whether or not the traveling speed of the vehicle 110 is higher than predetermined speed (step S2). Then, the actuator 4 is not driven, but keeps the mirror body 3 not pivoted as illustrated in FIGS. 1A and 1B. The speed sensor 8 consecutively inputs signals related to the traveling speed of the vehicle 110 to the controller 9. The controller 9 can determine whether the traveling speed of the vehicle 110 is higher or lower than the predetermined speed set in advance, by comparing the predetermined speed with the traveling speed of the vehicle 110.

Additionally, the predetermined speed is set at speed at which the traveling wind flowing through the back flowing area B takes away heat from the vehicle compartment of the vehicle 110 and a passenger in the vehicle compartment may feel cold. As the predetermined speed, for instance, speed at which traveling wind may significantly bring down the temperature of part of the vehicle compartment in the vicinity of the rear side window 107 and the heating efficiency of the vehicle compartment may be decreased is set as appropriate in accordance with the material and thermal conductivity of the rear side window 107, the aerodynamic characteristics of the vehicle body 100 in the back flowing area B at each speed zone, and the like.

If the traveling speed of the vehicle 110 is lower than the predetermined speed (NO in step S2), the traveling wind flowing through the back flowing area B does not take much heat from the vehicle compartment of the vehicle 110 via the rear side window 107. Specifically, for instance, when the temperature outside the vehicle 110 is low, but the vehicle 110 is parked or travels at relatively low speed, no traveling wind flows through the back flowing area B, or if any, slow traveling wind flows. Accordingly, heat is difficult to exchange between the outside of the vehicle 110 and the vehicle compartment the vehicle 110 via the rear side window 107, so that traveling wind takes away less heat from the vehicle compartment as a result.

In this case, the traveling wind does not thus bring down the temperature of the vehicle compartment of the vehicle 110 so much, in particular, part of the vehicle compartment in the vicinity of the rear side window 107. Accordingly, there is no need to drive the actuator 4. Even if the temperature of the vehicle compartment declines, the temperature does not decline so much, and thus actuating a heater of the vehicle compartment easily makes an environment of the vehicle compartment that a passenger feels as an appropriate temperature. That is to say, even if the temperature outside the vehicle 110 is lower than the predetermined temperature, the vehicle 110 traveling at lower speed than the predetermined speed does not cause the heating efficiency of the vehicle compartment to be decreased or causes the heating efficiency of the vehicle compartment to be decreased only a little. Accordingly, there is no need to drive the actuator 4.

If the traveling speed of the vehicle 110 is higher than the predetermined speed (YES in step S2), the traveling wind flowing through the back flowing area B takes much heat from the vehicle compartment of the vehicle 110 via the rear side window 107. While the vehicle 110 is traveling at high speed, the traveling wind flowing through the back flowing area B also flows at higher speed. Furthermore, the vehicle 110 has been recently designed to have more preferable aerodynamic characteristics with respect to the vehicle body 100 as the vehicle 110 travels at higher speed. Accordingly, when the vehicle 110 travels at high speed, traveling wind flows close to the rear side window 107. Accordingly, heat is continuously and efficiently exchanged between the outside of the vehicle 110 and the vehicle compartment of the vehicle 110 via the rear side window 107, so that traveling wind takes away much heat from the vehicle compartment of the vehicle 110 as a result.

Thus, in this case, the temperature of the vehicle compartment of the vehicle 110, in particular, the temperature of part of the vehicle compartment in the vicinity of the rear side window 107 declines too much to achieve an ideal heating efficiency even by driving a heater of the vehicle compartment. Accordingly, the actuator 4 has to be driven.

The actuator 4 is then driven (step S3). Specifically, if the specific conditions (the temperature outside the vehicle 110 is lower than the predetermined temperature (YES in step S1), and the traveling speed of the vehicle 110 is higher than the predetermined speed (YES in step S2)) are satisfied, a passenger of the vehicle 110 performs an operation of driving the actuator 4 via the operation input unit 6 illustrated in FIG. 3. The pivoting member 42 of the actuator 4, which receives an electrical signal for driving the actuator 4 from the controller 9, hereby pivots the mirror body 3 around the pivot shaft 41 as illustrated in FIG. 1C.

When the temperature of the vehicle compartment of the vehicle 110 declining via the rear side window 107 has a few or no effects on the heating efficiency as described above, it is possible to keep the vehicle compartment at an appropriate temperature, for instance, by driving a heating device. Furthermore, it is possible to overcome or relieve the difficulty of acquiring an ideal heating efficiency by driving the actuator 4 to pivot the mirror body 3 under the above-described specific conditions.

That is to say, it is possible to achieve, in the front flowing area A and the back flowing area B in particular, the aerodynamic characteristics of the vehicle body 100, the fuel efficiency of the vehicle 110, and the like intended when the vehicle 110 is designed by keeping the mirror body 3 not pivoted under a condition other than the above-described specific conditions, while it is possible improve the heating efficiency of the vehicle compartment of the vehicle 110 instead of part of the aerodynamic characteristics, the fuel efficiency, and the like to make a preferable environment of the vehicle compartment by pivoting the mirror body 3 under the specific conditions.

(4) Second Implementation

Next, a modification of the present invention will be described with reference to FIGS. 5A and 5B.

Figure 5A:
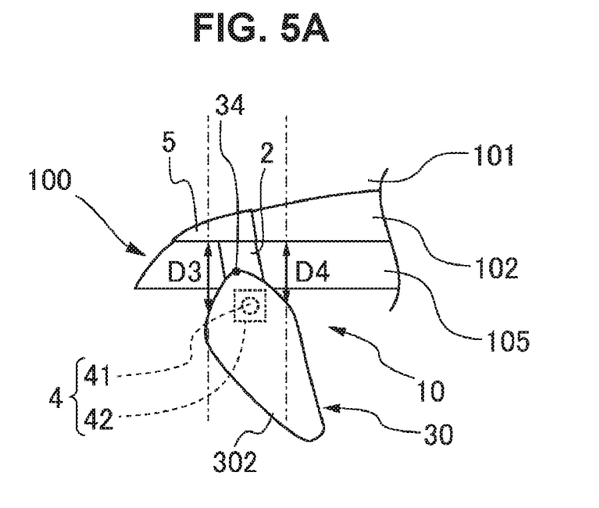
FIG. 5A is a schematic plan view schematically illustrating a door mirror according to another implementation of the present invention, and in particular, schematically illustrates the door mirror with a mirror body not pivoted.
Figure 5B:
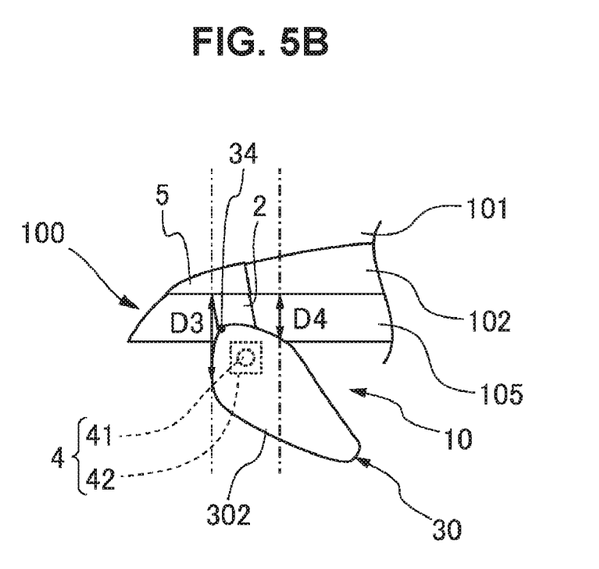
FIG. 5B is a schematic plan view schematically illustrating the door mirror according to the other implementation of the present invention, and in particular, schematically illustrates the door mirror with the mirror body pivoted.

Each of FIGS. 5A and 5B is a schematic plan view illustrating a door mirror 10 according to another implementation of the present invention. FIG. 5A is a schematic plan view illustrating the door mirror 10 with a mirror body 30 not pivoted. FIG. 5B is a schematic plan view illustrating the door mirror 10 with the mirror body 30 pivoted.

The shape of the cover 32 according to the implementation illustrated in FIGS. 1A to 1C is changed in the implementation illustrated in FIGS. 5A and 5B. The same members are used with respect to the other points, so that they are denoted with the same reference numerals, and repeated description of these structural elements is omitted.

As illustrated in FIGS. 5A and 5B, a cover 302 includes an inward protruding portion 34 (illustrated by the circle in black) protruding inward with respect to the width direction of the vehicle body 100 instead of the facing surface 33 of the cover 32 illustrated in FIGS. 1A to 1C. Additionally, the mirror body 30 is capable of rectifying traveling wind in the front flowing area A illustrated in FIG. 2A like the mirror body 3 when the vehicle 110 travels with the mirror body 30 not pivoted as illustrated in FIG. 5A.

The distances between the front side window 102 of the vehicle body 100 and a given portion of the cover 302 of the mirror body 30 are compared before and after the mirror body 30 is pivoted as the interval between the vehicle body 100 and the mirror body 30. First and second distances D3 and D4 between the front side window 102 and give two points of the cover 302 are compared before and after the mirror body 30 is pivoted in the implementation illustrated in FIG. 5.

As illustrated in FIG. 5B, the actuator 4 is driven, thereby pivoting the outward end of the mirror body 30 with respect to the width direction of the vehicle body 100 backward around the pivot shaft 41. Following this, the inward protruding portion 34 is pivoted forward around the pivot shaft 41. Once the mirror body 30 is pivoted as illustrated in FIG. 5B, the first direction D3 is increased and the second direction D4 is decreased as compared with those before the mirror body 30 is pivoted. That is to say, the mirror body 30 is pivoted due to the driven actuator 4, thereby changing the interval between the vehicle body 100 and the mirror body 30. Furthermore, as illustrated in FIG. 5B, the position of the inward protruding portion 34 in the front-back direction of the vehicle body 100 is also changed.

The mirror body 30 is designed to rectify traveling wind when the mirror body 30 is not pivoted, but is held in a posture for normal use as illustrated in FIG. 5A. That is to say, the shape and posture of the mirror body 30, the position at which the mirror body 30 is disposed, the area of a portion against which traveling wind hits, and the like decide the efficiency of rectifying the traveling wind. Once the mirror body 30 is pivoted, the posture of the mirror body 30, the area of a portion against which traveling wind hits, and the like are changed as compared with those before the mirror body 30 is pivoted. Furthermore, the driven actuator 4 changes the interval between the vehicle body 100 and the mirror body 30, and also changes the position of the inward protruding portion 34. Accordingly, once the mirror body 30 is pivoted, a mode for the mirror body 30 to rectify traveling wind in the front flowing area A illustrated in FIGS. 2A and 2B disagrees with the ideal rectifying mode used before the mirror body 30 is pivoted.

The flow of traveling wind is thus disturbed by the pivoted mirror body 30 in the front flowing area A, and then part of the traveling wind flows away from the rear side window 107 in the back flowing area B illustrated in FIGS. 2A and 2B. Accordingly, less heat is taken away by the traveling wind from the vehicle compartment of the vehicle 110 via the rear side window 107, and as a result, it is possible to prevent the temperature of the vehicle compartment from declining due to the traveling wind or to slow the decline of the temperature.

The facing surface 33 of the cover 32 illustrated in FIGS. 1A to 1C does not necessarily have to be formed like the cover 302 of the mirror body 30 illustrated in FIGS. 5A and 5B. The shapes of the mirror bodies are different depending on vehicles to which the present invention is applied. Accordingly, any shape can be adopted as the shape of the mirror body as long as it is possible to change the interval between the vehicle body and the mirror body by driving the actuator.

(5) Third Implementation

Next, another modification of the present invention will be described with reference to FIG. 6.

Figure 6:
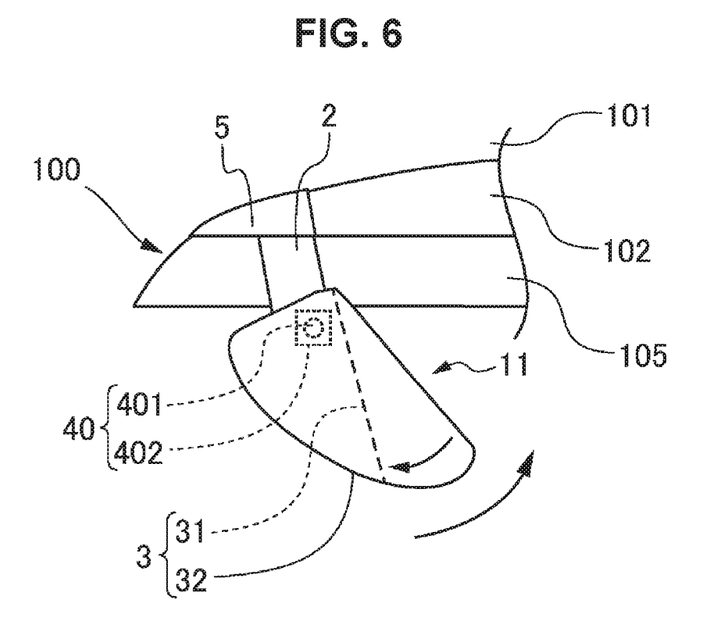
FIG. 6 is a schematic plan view schematically illustrating a door mirror according to another implementation of the present invention.

FIG. 6 is a schematic plan view illustrating a door mirror 11 according to another implementation of the present invention.

The actuator 4 according to the implementation illustrated in FIGS. 1A to 1C can pivot not only the mirror body 3 and the cover 32, but also the mirror 31 in the implementation illustrated in FIG. 6. The same members are used with respect to the other points, so that they are denoted with the same reference numerals, and repeated description of these structural elements is omitted.

As illustrated in FIG. 6, an actuator 40 includes a pivot shaft 401 and a pivoting member 402 like the above-described the actuator 4. The pivot shaft 401 is capable of switching between the connection state and the disconnection state with respect to the mirror 31 and the cover 32. That is to say, the pivot shaft 401 is capable of switching between the state in which only the mirror 31 is connected with the pivot shaft 401 and only the mirror 31 can be pivoted, and the state in which the mirror 31 and the cover 32 are connected with the pivot shaft 401 and the whole of the mirror body 3 can be pivoted. Meanwhile, the pivoting member 402 is capable of switching the pivoting directions of a member with which the pivot shaft 401 is connected. As a mechanism for switching the pivoting directions, it is possible to adopt a switching mechanism used when the existing mirror body is pivoted to the storage position and the use position.

First of all, the pivot shaft 401 is connected with the mirror 31 and the cover 32 as a mode for driving the actuator 40 in the implementation illustrated in FIG. 6. Furthermore, the pivoting member 402 is driven to pivot the whole of the mirror body 3 backward by a given angle. At this given angle, the pivoted cover 32 changes the interval between the vehicle body 100 and the mirror body 3 as compared with that before the cover 32 is pivoted and the flow of traveling wind is disturbed in the front flowing area A and the back flowing area B as in the implementations illustrated in FIGS. 1A to 2B.

Next, the pivot shaft 401 is switched to be connected with the mirror 31, and to be disconnected from the cover 32. Furthermore, the pivoting member 402 is driven to inversely pivot the mirror 31 by the same angle or substantially the same angle as the angle at which the cover 32 is pivoted. This makes it possible to secure backward visibility with the mirror 31 to the same extent as that before the actuator 40 is driven. The present implementation can thus both prevent the vehicle compartment of the vehicle 110 from being cooled due to traveling wind caused by pivoting the cover 32 or slow the cooling, and secure the backward visibility due to the pivoted mirror 31. As a result, it is possible to continuously travel without changing the posture of the mirror 31 relative to the vehicle body 100.

(6) Another Modification

The present invention can adopt a variety of modifications in addition to the implementations illustrated in FIGS. 1A to 6 as long as the object of the present invention can be achieved.

For instance, when the pivot shaft 4 of the actuator 4 pivots the cover 32 in the implementation illustrated in FIGS. 1A to 1C, it is recommended to pivot only the cover 32 without changing the posture of the mirror 31 relative to the vehicle body 100, which is preferable because this keeps the backward visibility secured via the mirror 31.

Meanwhile, as another mode for driving the actuator 40 according to the implementation illustrated in FIG. 6, for instance, the pivot shaft 401 may be first connected with only the mirror 31 to pivot the mirror 31 forward, and then the pivot shaft 401 may be connected with the mirror 31 and the cover 32 to pivot the mirror 31 and the cover 32 backward, thereby keeping the posture of the mirror 31 relative to the vehicle body 100 as a result.

As a modification of the above-described implementation, the door mirror stay 2 may be attached, for instance, to the front door panel 105 instead of the front side window 102 as in the implementation illustrated in FIG. 1. Basically, if the mirror bodies 3 and 30 are disposed substantially flush with a side window, it is possible to disturb the flow of traveling wind by pivoting the mirror bodies 3 and 30 due to the driven actuator 4. The door mirror stay 2 can be thus attached to any member at any position.

Additionally, the actuators 4 and 40 can pivot the mirror bodies 3 and 30 at any angle within the range within which the mirror bodies 3 and 30 that store the door mirrors 1, 10, and 11 can be pivoted in the above-described implementations as long as the pivoted mirror bodies 3 and 30 can disturb the flowing direction, flowing speed, and the like of traveling wind in the front flowing area A.

A mode in which the door mirror base 5 is not provided may be adopted in the above-described implementations. Depending on some designs of the vehicle 110, the door mirror stay 2 is directly attached to the front door panel 105. In this case, the mode in which the door mirror base 5 is not provided is adopted. The actuator can change the interval between the vehicle and the mirror body even in this mode, and thus there is no problem.

As another modification, modes can be adopted in which, for instance, the door mirror stay may extend substantially along the upper direction of the front side window or the front door panel, and may extend substantially outward with respect to the width direction, wind on the way, and then extend substantially along the upper direction, as long as the door mirror stay extends at least outward with respect to the width direction or the upper direction of the vehicle body.

Figure 4:
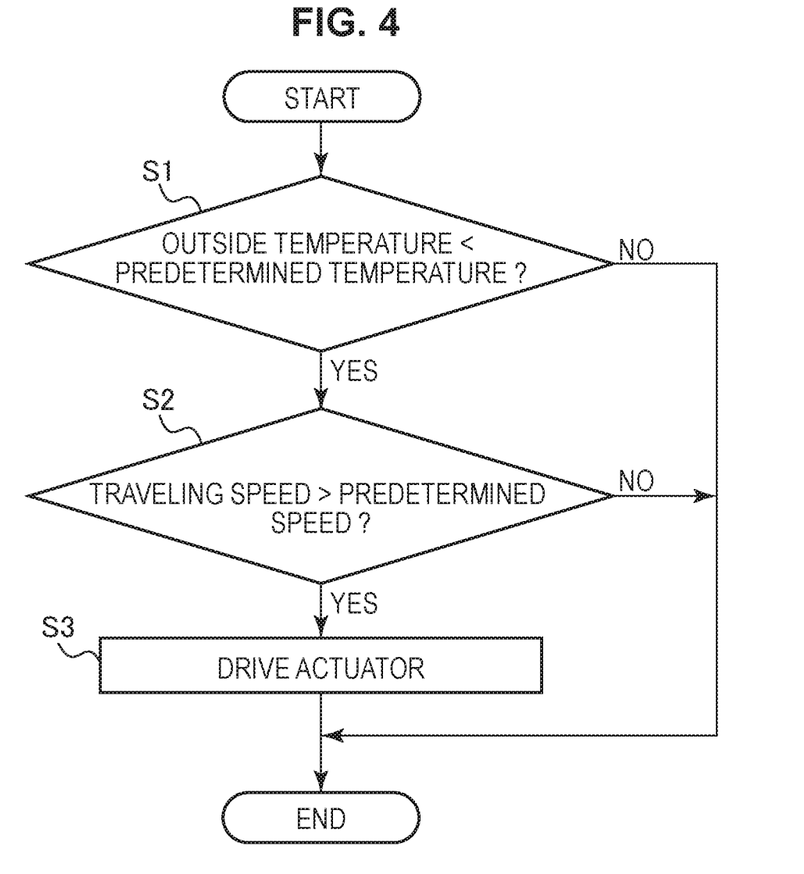
FIG. 4 is a flowchart for driving the actuator.

As long as the above-described specific conditions can be detected in the mode for controlling the actuator 4 which is illustrated in FIG. 4, the step of determining whether or not the temperature outside the vehicle 110 is lower than the predetermined temperature (step S1) may be exchanged in order with the step of determining whether or not the traveling speed of the vehicle 110 is higher than the predetermined speed (step S2).

Although information on the temperature outside the vehicle 110 and the traveling speed is consecutively input to the controller 9 in the implementation illustrated in FIG. 4, information on one of the temperature outside the vehicle 110 and the traveling speed may be, for instance, input to the controller 9 consecutively without inputting information on the other to the controller 9, and then if the input information satisfies the condition regarding a comparison with the predetermined temperature or the predetermined speed and one of the steps results in YES, the controller 9 may begin to receive the information on the other used for the other step.

Furthermore, a passenger performs a manual operation with the operation input unit 6 on the basis of the temperature outside the vehicle 110 and the traveling speed, which are displayed on the display unit 20, in the control system for driving the actuator 4 illustrated in FIG. 3. Instead of the above-described implementation, a mode may also be adopted in which, for instance, the operation input unit 6 is not provided, and the controller 9 automatically drives the actuator 4 to pivot the mirror body 3 by a given angle on the basis of the temperature outside the vehicle 110, the traveling speed, and the predetermined value set in advance.

The angles at which the mirror bodies 3 and 30 are pivoted are changed in accordance with how long and at what speed the actuators 4 and 40 are driven in the implementations illustrated in FIGS. 1A to 6, consequently changing the flowing amount and flowing direction of traveling wind in the back flowing area B. It is thus preferable to find out in advance in an experiment or the like how long and at what speed the actuators 4 and 40 are driven to disturb traveling wind the farthest from the rear side window 107.

When a passenger sits on only a front seat, the passenger does not or is unlikely to feel cold in spite of the decline of the temperature due to traveling wind in part of the vehicle compartment in the vicinity of the rear side window 107 in some cases. In this case, more traveling wind, which disturbs the flow, may be changed than when passengers sit on a front seat and a rear seat. That is to say, when a passenger sits on only a front seat, the traveling wind flowing in the vicinity of the rear side window 107 does not necessarily have to be disturbed. A modification is thus possible in which a sensor that detects a passenger is provided in a front seat and a rear seat, on which passengers sit, or at an appropriate position in the vehicle compartment of the vehicle 110. When the sensor detects that a passenger sits on only a front seat, the temperature outside the vehicle 110 is lower than the predetermined temperature, and the vehicle 110 travels at higher speed than the predetermined speed, the actuators 4 and 40 may be driven to adjust how much and at what angle the mirror bodies 3 and 30 are pivoted to disturb only the traveling wind flowing along the front side window 102. That is to say, when a passenger sits on only a front seat, and when a passenger also sits on a rear seat, it is adjusted, for instance, how much the mirror bodies 3 and 30 are appropriately pivoted.

Additionally, the information acquired in steps S1 and S2 illustrated in FIG. 4 is an example of a traveling environment serving as a trigger to move the mirror body in the present invention, and the information acquired by the above-described sensor that detects a passenger is an example of a passenger state in the present invention.

Although the implementations to which the invention made by the present inventors is applied have been described so far, the description and the drawings serving in the implementations as part of the disclosure of the present invention do not limit the present invention. For instance, an auxiliary member is formed in a disc shape or a columnar shape in Example, but may also be formed in other shapes. In other words, it should be noted that another implementation, Example, operation technique, and the like that those skilled in the art conceive on the basis of the implementations are all within the technical scope of the present invention.

Although the preferred implementations of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A door mirror disposed at a side of a vehicle body, the door mirror comprising:
   a mirror body provided at a tip of a door mirror stay that extends from the side of the vehicle body in at least one of a width direction of the vehicle body and a vertical direction of the vehicle body; and an actuator configured to change an interval between the vehicle body and the mirror body based on at least a temperature outside a vehicle that is equipped with the door mirror and based on a traveling speed of the vehicle, wherein the temperature outside the vehicle is less than a determined temperature, and wherein the actuator includes:
a pivot shaft along the vertical direction of the vehicle body, and
a pivoting member configured to pivot an outward end of the mirror body, with respect to the width direction of the vehicle body, backward around the pivot shaft.

2. The door mirror according to claim 1, wherein the mirror body includes:
a mirror that includes a mirror surface that faces backward with respect to an advancing direction of the vehicle, and
a cover over at least a front portion of the mirror, wherein the front portion of the mirror faces in the advancing direction of the vehicle, and
wherein the pivot shaft is configured to switch between a first state in which the mirror is connected to the pivot shaft and the cover is disconnected from the pivot shaft, and a second state in which both the mirror and the cover are connected to the pivot shaft.

3. The door mirror according to claim 1, wherein the mirror body includes:
a mirror that includes a mirror surface that faces backward with respect to an advancing direction of the vehicle, and
a cover over at least a front portion of the mirror, wherein the front portion of the mirror faces in the advancing direction of the vehicle, and
wherein the actuator is configured to pivot the cover backward with respect to the advancing direction of the vehicle, while a posture of the mirror relative to the vehicle body remains unchanged.

4. A door mirror disposed at a side of a vehicle body, the door mirror comprising:
a mirror body provided at a tip of a door mirror stay that extends from the side of the vehicle body in at least one of a width direction of the vehicle body and a vertical direction of the vehicle body; and
an actuator configured to change an interval between the vehicle body and the mirror body based on at least a temperature outside a vehicle that is equipped with the door mirror and based on a traveling speed of the vehicle, wherein the temperature outside the vehicle is less than a determined temperature, and
wherein a change amount of the interval between the mirror body and the vehicle body is variable based on a sitting state of a passenger inside the vehicle, wherein the sitting state of the passenger is based on a detection of the passenger in at least one of a front seat of the vehicle or a back seat of the vehicle.

5. A vehicle, comprising:
a vehicle body; and
a door mirror disposed at a side of the vehicle body, the door mirror comprising:
a door mirror stay that extends from the side of the vehicle body in at least one of a width direction of the vehicle body and a vertical direction of the vehicle body;
a mirror body provided at a tip of the door mirror stay; and
an actuator configured to change an interval between the vehicle body and the mirror body based on at least a temperature outside the vehicle, and based on a traveling speed of the vehicle, wherein the temperature outside the vehicle is less than a determined temperature, and
wherein the actuator includes:
a pivot shaft along the vertical direction of the vehicle body, and
a pivoting member configured to pivot an outward end of the mirror body, with respect to the width direction of the vehicle body, backward around the pivot shaft.

6. A vehicle, comprising:
a vehicle body; and
a door mirror disposed at a side of the vehicle body, the door mirror comprising:
a door mirror stay that extends from the side of the vehicle body in at least one of a width direction of the vehicle body and a vertical direction of the vehicle body;
a mirror body provided at a tip of the door mirror stay; and
an actuator configured to change an interval between the vehicle body and the mirror body based on at least a temperature outside the vehicle and based on a traveling speed of the vehicle, wherein the temperature outside the vehicle is less than a determined temperature, and
wherein a change amount of the interval between the mirror body and the vehicle body is variable based on a sitting state of a passenger inside the vehicle, wherein the sitting state of the passenger is based on a detection of the passenger in at least one of a front seat of the vehicle or a back seat of the vehicle.

* * * * *